United States Patent [19]
Caspers et al.

[11] 3,731,304
[45] May 1, 1973

[54] TRACK-BEFORE-DETECT SYSTEM

[75] Inventors: James W. Caspers; Carlos Nuese, both of San Diego, Calif.

[73] Assignee: The United States of America as represented by the Secretary of the Navy

[22] Filed: Sept. 8, 1961

[21] Appl. No.: 137,944

[52] U.S. Cl.................343/5 DP, 343/7 A, 343/11 R
[51] Int. Cl...................................................G01s 9/14
[58] Field of Search......................343/5, 7, 11, 5 DP; 235/151 A, 151 J Primary Examiner—Samuel Feinberg
Assistant Examiner—G. E. Montone
Attorney—R. S. Sciascia and G. J. Rubens

EXEMPLARY CLAIM

1. A track detection system comprising; receiving means for receiving reflected radio frequency signals from an object in a given medium, range storage means operatively coupled to said receiving means for storing range, information therein between a minimum and maximum range, position indicating means operatively coupled to said receiving means for indicating the direction from which said radio freuqency signals are received, position storage means comprising shift register means operatively coupled to said position indicating means for storing information therein corresponding to receiving means position and sequentially shifting said information through said register with respect to time, coincidizing means operatively coupled to said range storage means and said position storage information and producing outputs therefrom when data corresponding to a particular range and a particular position of the receiving means are coincident therein, said coincidence means being operative to perform a cross-correlation with a class of possible tracks; counting means operatively coupled to said coincidizing means for counting a number of outputs from said coincidizing means and performing a decision as to the presence or absence of an object for each test track.

13 Claims, 7 Drawing Figures

INVENTORS
JAMES W. CASPERS
CARLOS (NMI) NUESE

FIG. 2

INVENTORS
JAMES W. CASPERS
CARLOS (NMI) NUESE
BY
ATTORNEYS

FIG. 3

INVENTORS
JAMES W. CASPERS
CARLOS (NMI) NUESE

BY

ATTORNEYS

FIG. 4

INVENTORS
JAMES W. CASPERS
CARLOS (NMI) NUESE

BY

ATTORNEYS

| | 370 MI | | | | | | | | | | | RANGE INTERVALS | | | | | | | | | | | | | | | | | | | 400 MI | | | |
|---|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | G | P | M |
| 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | ∞ | 0 | 1 |
| 2 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | ∞ | 0 | 1 |
| 3 | 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 27 | 1 | 29 |
| 4 | 1 | 1 | 0 | 1 | 0 | 1 | 0 | 1 | 0 | 1 | 0 | 1 | 0 | 1 | 1 | 1 | 0 | 1 | 0 | 1 | 0 | 1 | 0 | 1 | 0 | 1 | 0 | 1 | 1 | 0 | 25 | 2 | 2 |
| 5 | 1 | 1 | 0 | 1 | 0 | 1 | 0 | 1 | 0 | 1 | 0 | 1 | 1 | 1 | 0 | 1 | 0 | 1 | 0 | 1 | 0 | 1 | 1 | 0 | 1 | 0 | 1 | 1 | 0 | 1 | 23 | 2 | 4 |
| 6 | 1 | 1 | 0 | 1 | 0 | 1 | 0 | 1 | 0 | 1 | 0 | 1 | 1 | 1 | 0 | 1 | 0 | 1 | 0 | 1 | 1 | 0 | 1 | 0 | 1 | 0 | 1 | 1 | 0 | 1 | 21 | 2 | 6 |
| 7 | 1 | 1 | 0 | 1 | 0 | 1 | 0 | 1 | 0 | 1 | 0 | 1 | 1 | 1 | 0 | 1 | 0 | 1 | 1 | 0 | 1 | 0 | 1 | 0 | 1 | 1 | 0 | 1 | 0 | 1 | 19 | 2 | 8 |
| 8 | 1 | 1 | 0 | 1 | 0 | 1 | 0 | 1 | 0 | 1 | 0 | 1 | 1 | 1 | 0 | 1 | 1 | 1 | 1 | 0 | 1 | 0 | 1 | 0 | 1 | 0 | 1 | 0 | 1 | 0 | 17 | 2 | 10 |
| 9 | 1 | 1 | 0 | 1 | 0 | 1 | 0 | 1 | 0 | 1 | 0 | 1 | 1 | 1 | 1 | 0 | 1 | 0 | 1 | 0 | 1 | 0 | 1 | 0 | 1 | 0 | 1 | 0 | 1 | 0 | 15 | 2 | 12 |
| 10 | 1 | 1 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 1 | 0 | 13 | 2 | 14 |
| 11 | 1 | 1 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 1 | 0 | 1 | 11 | 3 | 13 |
| 12 | 1 | 1 | 0 | 1 | 0 | 1 | 0 | 1 | 0 | 1 | 1 | 0 | 1 | 0 | 1 | 0 | 1 | 0 | 1 | 1 | 0 | 1 | 0 | 1 | 0 | 1 | 0 | 1 | 0 | 1 | 9 | 3 | 11 |
| 13 | 1 | 1 | 0 | 1 | 0 | 1 | 0 | 1 | 1 | 0 | 1 | 0 | 1 | 0 | 1 | 0 | 1 | 1 | 0 | 1 | 0 | 1 | 0 | 1 | 0 | 1 | 1 | 0 | 1 | 1 | 7 | 4 | 9 |
| 14 | 1 | 1 | 0 | 1 | 0 | 1 | 1 | 0 | 1 | 0 | 1 | 0 | 1 | 1 | 0 | 1 | 0 | 1 | 0 | 1 | 1 | 0 | 1 | 0 | 1 | 0 | 1 | 0 | 1 | 1 | 5 | 5 | 7 |
| 15 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 3 | 6 | 5 |
| 16 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 10 | 3 |
| 17 | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 0 | 1 | — | — | 4 |

NOTES
1 INDICATES TARGET IN INTERVAL DURING SUCCESSIVE SCANS (6 OR 7 HITS POSSIBLE).
0 INDICATES TARGET NOT IN INTERVAL.
G IS NO. OF RANGE INTERVALS BETWEEN PAIRS
P IS NO. OF PAIRS IN 30-MILE TRACK SEQUENCE.
M IS NO. OF SEQUENCES HAVING SIMPLE REPETITIVE PATTERN OF SEQUENCE
VELOCITY RANGES FROM 1200 MPH TO 1800 MPH.

INVENTORS
JAMES W. CASPERS
CARLOS (NMI) NUESE
BY
ATTORNEYS

TRACK-BEFORE-DETECT SYSTEM

The invention described herein may be manufactured and used by or for the Government of the United States of America for governmental purposes without the payment of any royalties thereon or therefor.

The present invention relates to a radar tracking system and more particularly, to a track detection system which presents decisions relative to the existence of a target track rather than a sequence of decisions relative to target positions and specifically, to a track before detect system which utilizes a process consisting of cross correlation of radar data with a class of possible tracks followed by a decision or detection process.

Among the prior art methods of target tracking is the detect-before-track technique utilizing the very common method of plotting a target track by means of a sequence of detections. Each affirmative decision is associated with some region in physical space, and the time order sequence of these positions yields the target track. The detections are performed on each single scan on the radar antenna.

However, a radar system designed for both long range and short range operation often has conflicting requirements as regards radar parameters. A typical example is the conflict in antenna scan rate needs. Thus, a slow scan is desired in long ranges to obtain a large number of returns per scan for satisfactory detection. A slow scan, however, is usually unsatisfactory for short-range tracking of fast targets and yields poor tracking data and additionally, a slow scan rate yields either poor or no velocity information unless Doppler techniques are used. However, if a high scan rate is utilized there is a subsequent detection loss.

Thus, changing antenna rpm from 1 to 15 rpm in the detect-before-track system requires about 12 db increase in signal-to-noise ratio if single scan detection probabilities are fixed. At a 1 rpm scan rate, a 2 db S/N signal would be judged as detectable, but not at 15 rpm.

An object of the invention is to provide a track detection system for simplified detection on the basis of binomial detection.

Another object of the invention is to provide a track detection system for detection on the basis of analog detection.

An additional object of the invention is to provide a track detection system using digital techniques.

A further object of the invention is to provide a track detection system wherein sequential detection is applicable to track-detection for systems having the usual fixed-rate scanning antenna.

An additional object of the invention is to provide a track before detect system which allows the use of high antenna scan rates with an extremely small accompanying detection loss.

A further object of the invention is to provide a track detection system which uses a high antenna scan rate wherein long range detection may be accomplished without accompanying detection loss while accomplishing short range tracking of fast objects as well.

A further object of the invention is to provide a track-before-detect system which provides speed and course information.

Various other objects and advantages will appear from the following description of several embodiments of the invention, and the novel features will be particularly pointed out hereinafter in conjunction with the appended claims.

The invention will be described in greater detail by reference to the following description taken in connection with the accompanying drawings wherein like numerals refer to like parts.

Figure 1:
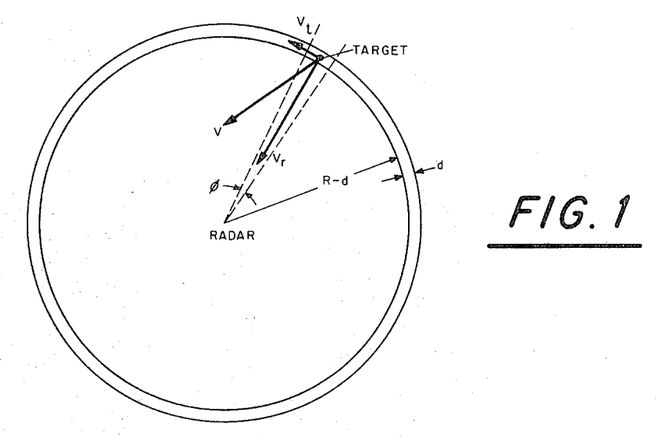
FIG. 1 is a schematic diagram of an annular zone of observation.

The problem of detecting the passage of an object through an annular zone of observation, as illustrated in FIG. 1 will be considered, for example. Let the zone extend from $R - d$ to R, the maximum range under consideration. If d is much less than R the signal characteristics can be assumed fixed and invarient with range and for a conservative approach the maximum range signal characteristics shall be used. Let the objects radial velocity be $V_4$, its tangential velocity $V_t$, and its total velocity V. The problem shall be restricted to objects having large radial components $V_r$, much greater that $V_t$ or V approximately equal to $V_r$.

The use of a pulse radar system having a basic period of $\tau$ seconds, antenna scan rate of $\omega$ radians per second, and an antenna beam width of $\phi$ radians will be assumed. Then the number of possible return echoes h in scanning across a small object is $h = \phi/\omega\tau$, where $\tau$ is in seconds and is the basic period of a pulse radar system. The problem is to detect the target on the basis of echo data collected from one or more scans.

Figure 2:
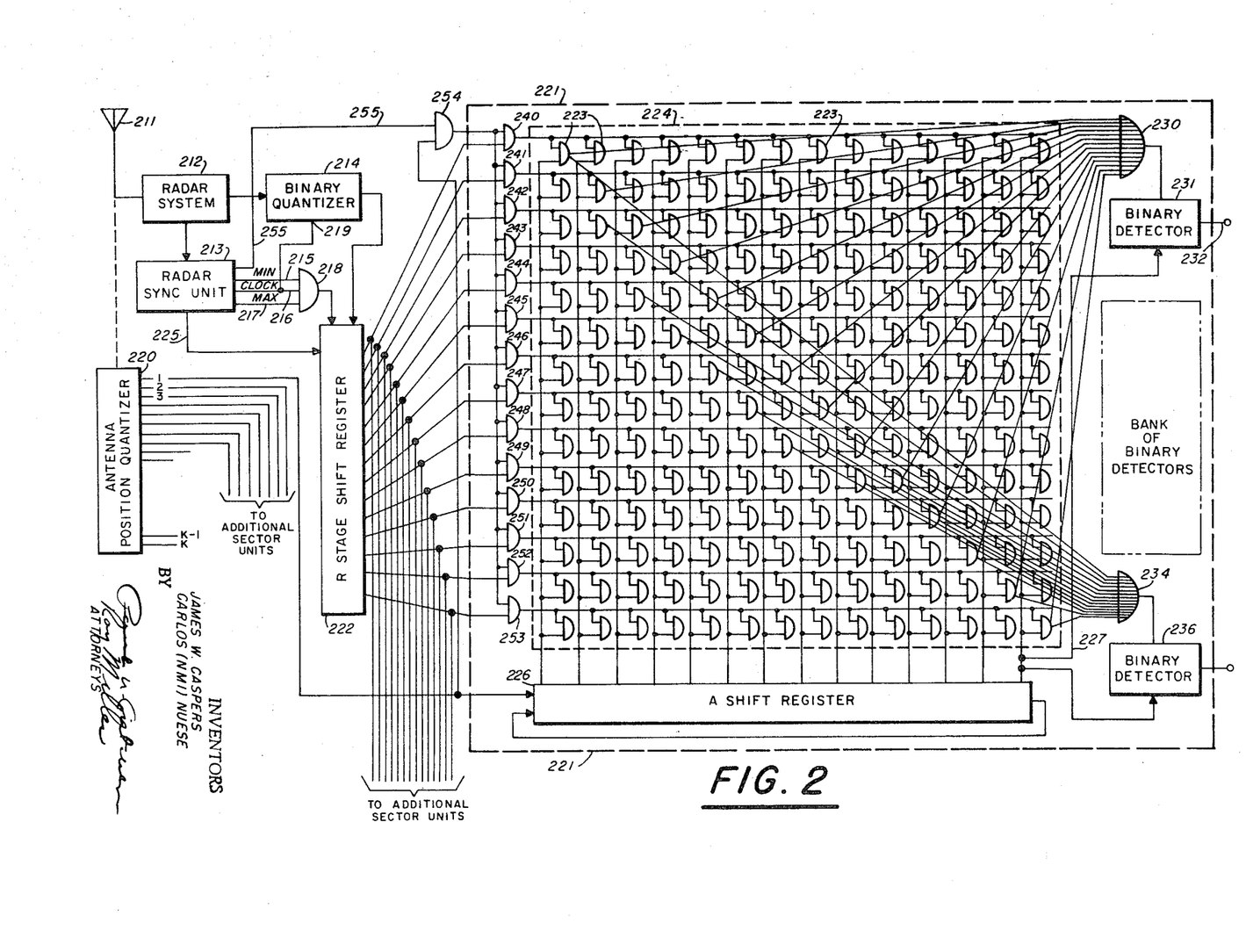
FIG. 2 is a schematic diagram of an illustrative embodiment of the invention utilizing binary quantized video in the detection process.

In the embodiment of the invention as set forth in FIG. 2 signals from objects in a given medium are received on antenna 211 and are coupled to a radar system 212 containing a receiver and the signals appear as a receiver output voltage. The radar system may or may not transmit through the antenna 211, however, coordination is required with the transmitted signal regardless of the antenna used in order to obtain range information. This information is available in radar synchronization unit 213 for ranging purposes. The output of the receiver in radar system 212 is introduced into a quantizer 214 wherein the video signal is quantized into ones and zeros with respect to a chosen quantizing level. The quantization of video signals into ones and zeros with respect to a suitably chosen quantizing level introduces a small loss in system performance, about 2 db; however, the 2 db loss is absorbed in order to produce a simplified automatic track-before-detect radar system. The minimum range pulse appears at the output of radar sync unit 213 on line 215, a clock pulse on line 216, and a maximum range pulse on line 217, all of which form inputs to an AND gate 218. In addition, the clock pulse appearing on line 216 is coupled at 219 to the quantizer 214 for suitably synchronizing the quantizer output with the range information from the radar synchronizing unit 213.

In addition, antenna azimuth from the radar antenna 211 is introduced into an antenna position quantizer 220 which comprises a multi-positioned commutator for indicating the direction in which the radar antenna 211 is pointed at any given time. Thus, the output of the antenna position quantizer is a series of pulses corresponding to position 1, position 2, position 3, through position K-1, and position K. For each of the various antenna sectors as represented by the positions one through K there is a sector track detector as indicated within dotted line 221.

Quantized video from the quantizer 214 is coupled to a range shift register 222. In addition, the output of AND gate 218 is also coupled to the range shift register 222 in the form of a train of shift pulses which starts at the minimum range and stops at the maximum range. The outputs of the R shift register form one input to AND gates 240–253 respectively, and are also connected to additional sector units. The AND gates 240–253 are necessary in that one R shift register is used to provide information to all matrices and therefore requires isolation between the various matrices. The other input to AND gates 240–253 comprises the output of AND gate 254. The inputs to AND gate 254 comprise the appropriate sector pulse from the antenna position quantizer and a trigger pulse from the radar sync unit 213 on line 255. Thus, when a pulse is present from the appropriate sector, i.e. sector 1 in the example, AND gates 240–253 will allow information from the shift register 222 to be read into the matrix 224.

Connected to the outputs of the AND gates 240–253 are a multiplicity of AND gates 223, forming a coincidizing matrix 224. Also coupled to the range shift register is another output from radar sync unit 213 which enables a write-out in parallel pulse to be applied through line 225 to the range shift register.

In the example set forth the first sector will be treated therefore, an antenna shift register 226 is coupled to the 1st segment of the antenna position quantizer 220. The outputs from the antenna shift register form one input to the AND gates 223 comprising the coincidizing matrix.

Theoretical tracks of probable object trajectories or paths are plotted in advance and set up in the coincidizing matrix 224 wherein the outputs of particular of the AND gates 223 connected to OR gate 230 would represent a predicated track. Another possibile track would comprise the outputs of AND gates 223 connected to OR gate 234. The outputs of AND gates 223 coupled through digital OR gate 230 are coupled to a binary detector 231 wherein the cross correlation with the predicted track is accomplished and the presence or absence of a correlation is indicated at the output 232. Upon the completion of the predicted track a reset pulse is coupled from an output line from the antenna shift register 226 as at 227 as a reset pulse for binary detector 231. For each of the probable tracks an OR gate as at 230 and 234 would be provided along with its associated detector 231 and 236. Additionally, the reset pulses would be applied to the detectors upon the termination of a probable track as at 227 in the coincidizing matrix.

Thus, the operation of the 1st sector would be as follows; binary quantized video in a one and zero sequence is fed into the range shift register 222 for the 1st sector. The minimum range signal starts a sequence of shift pulses into the range shift register 222, the last shift pulse being determined by the maximum range signal appearing on line 217. The time interval between the minimum and maximum range determines the number of shift pulses of which there are $r$. Thus, for a given radar sweep the shift register 222 is loaded with 1's and 0's in accordance with the quantized zero for each corresponding range interval. This process will repeat for each radar sweep as the antenna 211 scans the sector under discussion, in this case, the 1st sector. Upon a read-out pulse being applied on line 225 the output of each stage of the shift register 222 enters the AND gate matrix represented at 224. There is an AND gate matrix 224 for each sector and each is connected to the range shift register 222 as illustrated.

Antenna azimuth data from the antenna 211 is quantized according to the antenna position with respect to the sectors. This pulse lasts for the scan time of the sector and is applied to the antenna shift register 226 associated with the appropriate sector. Exactly one stage of the antenna shift registers 226 is set at one, all other stages at zero. In the present example the antenna pulse corresponding to the 1st sector causes a stage of the A shift register 226 to read out into the AND gate matrix 224. The trailing edge of the pulse causes the shift register to shift one place to the right. As with the AND gate matrix 224, there is an antenna shift register 226 associated with each azimuth sector.

The AND gate matrix 224 consists of an array of two input AND gates 223 and an AND gate is located at the intersection of each vertical and horizontal line in the matrix.

Selected outputs of the AND gates corresponding to theoretical tracks connect to OR gates which are connected to appropriate binary detectors in the detector banks. The detectors are binary counters with an AND gate set to indicate when the counter reaches some predetermined count.

Consider the top binary detector 231. Assume that the antenna shift register 226 has a 1 in the first or far left stage and the antenna enters the 1st sector. Quantized video between the minimum and maximum range is fed into the range shift register 222 and when this data is thus stored, a write parallel pulse from radar sync unit 213 is coupled through line 225 to the range shift register 222, which could be coincident with the next radar transmission, and causes the output of each stage of the range shift register 222 to enter the AND gate matrix 224. The output of the top or maximum range increment thus enters the top OR gate 230 and hence, the top binary counter detector 231. After each radar transmission this process repeats until the antenna swings out of the 1st sector. Thus, the number of 1's seen at the maximum range is held in the top binary detector 231 and the 1 in the antenna shift register 226 shifts one place to the right, i.e., to the second stage. When the antenna again enters the 1st sector, the 1 from the antenna shift register 226 is entered on the second vertical line of the AND gate matrix 224. The video is again stored in the range shift register 222 as before and is read out by the write out in parallel pulse on line 225. Thus, the quantized video from the range increment next to the maximum is entered into the top binary detector 231 again. This process repeats until the antenna again leaves the 1st sector and the 1 is shifted to the 3rd stage of the antenna shift register 226. The binary detector 231 now would hold the total number of ones for two scans of the radar antenna 211, the first scan across the maximum range increment r and the second scan across the range increment $r-1$. For the detector 231, data from the $r-3$ range increment enters on the 3rd scan of the antenna. This process continues until either the test track terminates in the matrix 224 as represented by the reset pulse applied to the binary detector 231 from the output line or the binary detector 231 reaches the predetermined count which indicates a correlation with the theoretical track.

When the one in the antenna shift register reaches the last stage of the antenna shift register 226 it shifts back to the first stage of the antenna shift register and the process repeats.

Binary detector 236 indicates connections for another typical track. The connections to binary detector 236 indicates an object which slows down in the medium. Again, the binary detector 236 is reset at the end of the last scan as indicated at 227 for this particular track.

Note that a binary detector is used for each track that is to be detected. A perfect match between the test track and actual target positions gives the best detection probability for a given track, however, a slight mismatch between the test track and actual target positions will degrade the detection probability only slightly. Thus, in practice, not all possible tracks are required to sufficiently cover the possible tracks.

All other azimuth sectors operate in a manner like the one just described. The number of these sectors depends upon the angle of the area of surveillance and the sector widths. The sectors in the present example are adjusted to the three db width of the antenna beam, or approximately so, and either meet or overlap slightly.

Connecting different AND gate matrices outputs together through OR gates into a single binary detector will allow test tracks where the target changes from one sector to another, thereby allowing tests for non-radial tracks. However, targets having non-radial tracks present much stronger reflections and less sophisticated methods of tracking may be used.

The discussion presented covers the case where track detection process terminates at some fixed range position, i.e., a minimum range. For receding targets the maximum range might be used, however, rather than this, the test track might terminate on a fixed number of scans instead.

Figure 3:
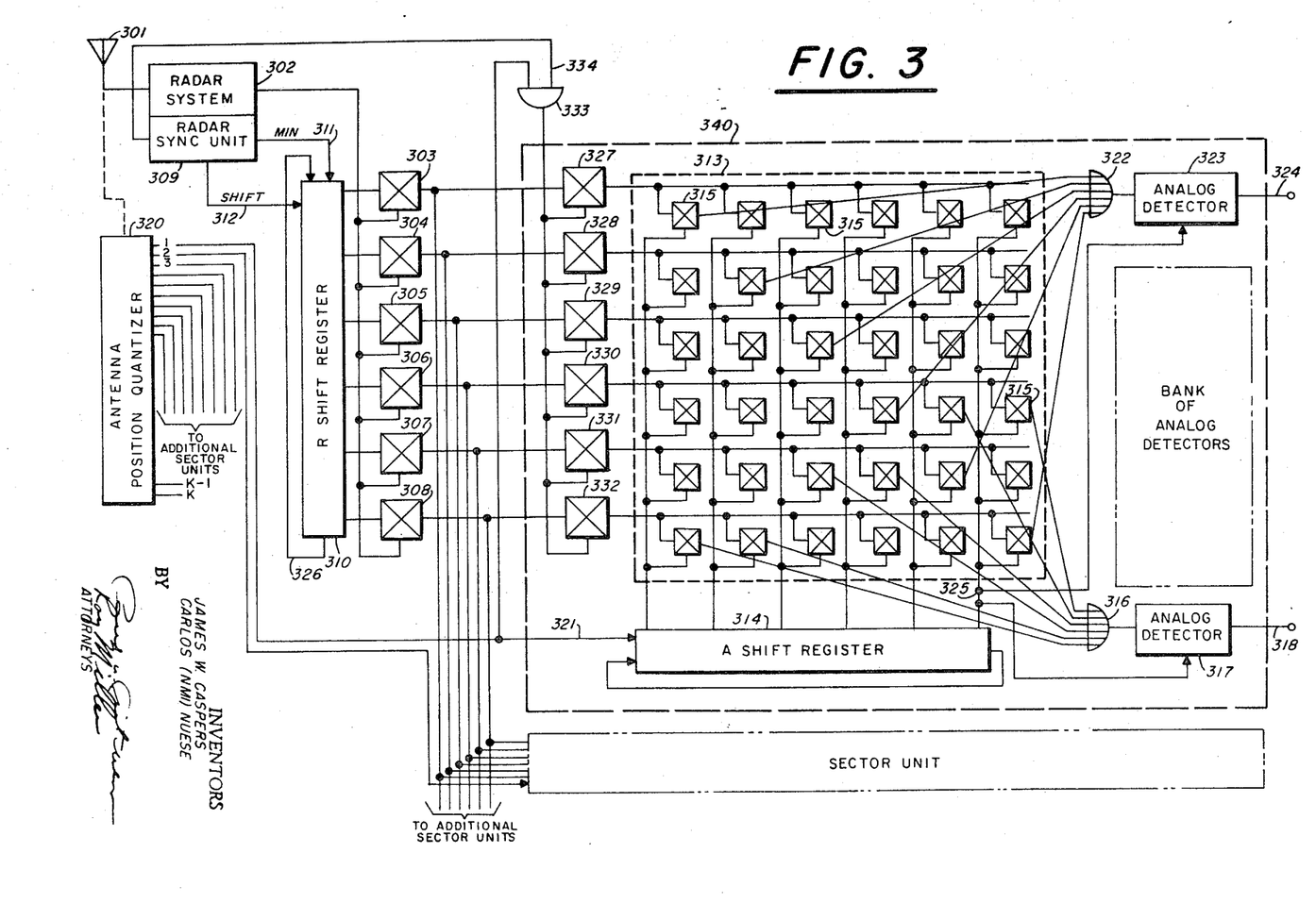
FIG. 3 is a schematic diagram of an embodiment of the invention which uses analog detectors.

FIG. 3 is an embodiment of the system utilizing analog techniques. In this embodiment the properly selected video signals must be routed to the various track detectors in the detector banks.

The reflected signals from objects in the appropriate medium are received on a radar antenna 301 and coupled to a radar receiver in a radar system 302. The output from the radar system 302 then is coupled to the inputs of analog AND gates 303 through 308.

A radar sync unit 309 is utilized to provide the range information for a range shift register 310 which is common to all sector units. One output from the radar sync unit 309 comprises the minimum range pulse which is coupled through input line 311 to the range shift register 310. Another output from radar sync unit to range shift register 310 comprises the shift pulse output which is coupled through line 312 to the range shift register 310. The range shift register carries a "1" in one stage only which is shifted sequentially through the register and recirculated on line 326.

Coupled to the output of the AND gates 303–308 are another series of AND gates 327–332 which isolate the individual sector units. The outputs of the AND gates 303–308 are also coupled to the other sector units. The other input to AND gates 327–332 comprises the output from AND gate 333 which comprises a two legged gate. The inputs to gate 333 comprise the appropriate sector pulse and the trigger pulses from the radar sync unit coupled through line 334. Thus, when the appropriate sector is under surveillance information from gates 303–308 will be read into the matrix 313 through gates 327–332.

A coincidizing matrix 313 and an azimuth shift register antenna shift register 314 contained within sector unit 340 are supplied for each of the sectors under surveillance. The coincidizing matrix 313 comprises a plurality of analog AND gates 315.

Simultaneously, with the rf signal which is coupled from the radar antenna 301 to the radar receiver, antenna azimuth data is also coupled from the radar antenna 301 to an antenna position quantizer 320 comprising a commutator which provides a series of output pulses corresponding to azimuth sector position. Treating just the 1st position, the 1st pulse is coupled to the antenna position shift register 314 through line 321 which wil cause the antenna position shift register 314 to function in a fashion to be explained, subsequently.

The output from the coincidizing matrix 313 corresponding to the theoretical tracks, are coupled through an OR gates 322 and 316 to analog detectors 323 and 317, respectively, wherein the correlation function takes place and a subsequent output on lines 324 and 318 results, either indicating a track detection or not. Under the termination of a track or when a track decision is made in the coincidizing matrix 313 a reset pulse is applied upon the termination of the theoretical track and applied as at 325 to the analog detector 323 in order to start the counting process over again. It is to be understood that OR gates corresponding to 322 and analog detector corresponding to 323 will be provided corresponding to the number of theoretical tracks in the particular sector. However, only two are shown for the purposes of illustration.

In the operation of the embodiment of FIG. 3 the receiver output voltage from the radar system 302 enters a bank of electronic gates 303 through 308 which routes the voltage to the coincidizing matrix 313 as controlled by the range shift register 310.

The minumum range pulse, which occurs at the time corresponding to the reception of signals from the near end of the observation zone, is coupled through line 311 from the radar sync unit 309 to the range shift register 310 and is shifted by the shift pulse appearing on line 312 into the minimum range stage of the range shift register 310. The output of the first stage of the range shift register 310 connects to the first gate 303 and switches the receiver output into the top line of the coincidizing matrix 313. The shift pulse enters according to the range resolution of the radar unit and shifts the 1 down the range shift register 310 turning on each gate 304 through 308 in sequence until all gates have been turned on. However, only one gate is on at any one time. Thus, the voltages on the horizontal lines of the coincidizing matrix 313 represent closing range increments going from top to bottom.

The antenna position shift register 314 operates exactly the same as the antenna position shift register 225 of the embodiment of FIG. 2 and, therefore, the explanation relative thereto is not repeated. However, it is again noted that the coincidizing matrix corresponding to the sector containing the radar beam at any one time has a 1 on only of its vertical lines at any one time.

The coincidizing matrix 313 operates in the same manner as the previous binary coincidizing matrix of FIG. 2 except for one important distinction. The gates in the coincidizing matrix 313 preserve the amplitude information in their outputs when turned on while the AND gates of the embodiment of FIG. 2 only indicate ones or zeros.

The OR gates corresponding to 322 and 316 feeding the detectors 323 and 317 also preserve amplitude information and an OR gate used in this mode has an output equal to the maximum of the input voltages. Since all inputs except one are zero, the OR gate enters the selected voltage without coupling signals back into other parts of the coincidizing matrix 313.

The detectors such as detector 323 and 317 consist of simple summing devices which indicate when the total accumulated voltage exceeds some predetermined level. Upon a determination being made, i.e., whether or not the voltage level is exceeded, an output appears on line 324 and the process is repeated by coupling the reset pulse from the coincidizing matrix corresponding to the last sample point which recycles the analog detectors. The embodiment of FIG. 3 illustrates a connection to track detector 317 set for an outgoing target object in the medium. As explained previously, any desired track may be set in by proper connection of the detectors through the OR gates to the coincidizing matrix.

Figure 4:
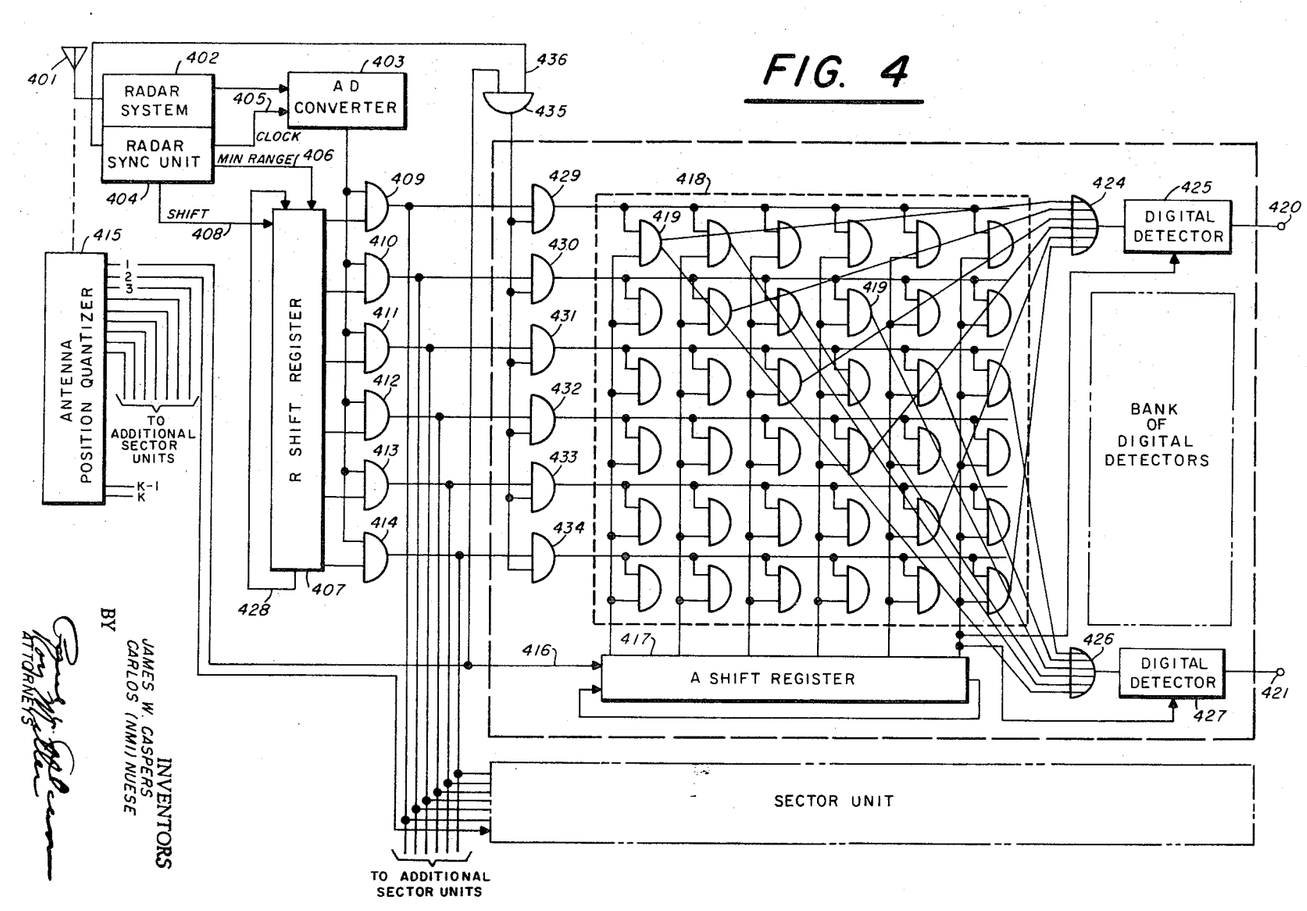
FIG. 4 is a schematic diagram of an embodiment of the invention utilizing digital techniques.

FIG. 4 is an illustration of an embodiment of the invention utilizing digital techniques to perform the functions set forth with respect to the analog system of FIG. 3.

Reflected signals from objects in the medium under observation are received on antenna 401 and coupled to a receiver in the radar system. The output of the receiver 402 comprises one input to an analog-to-digital converter 403. A synchronization unit 404 is used to provide a clock pulse on line 405 as another input to the analog digital converter 403. In addition, the synchronization unit 404 supplies a minimum range pulse on line 406 to a range shift register 407. An additional clock pulse from the synchronization unit 404 is coupled through line 408 to range shift register 407 for the purpose of shifting the minimum range pulse through the range shift register. The register 407 carries a "1" in only one stage at any one time and is shifted sequentially through the register and recirculated on line 428.

The output of the analog-to-digital converter 403 is coupled to the inputs of a plurality of digital AND gates 409 – 414. The other input to the digital AND gates 409 – 414 comprises output pulses from the range shift register 407.

Antenna azimuth information is also coupled from the antenna 401 to an antenna position quantizer 415 which produces a series of output pulses corresponding to antenna positions with respect to time. For the purposes of illustration only one sector is treated and in this example the 1st pulse is coupled through line 416 to a antenna position shift register 417 which functions the same as the antenna position shift register 314 of the embodiment of FIG. 3.

Connected to the outputs of AND gates 409 – 414 are a series of AND gates 429 – 434 respectively, which are used to provide isolation between the individual sector units. One input to the AND gates 429 – 434 comprises the output of a corresponding AND gate 409 – 414 while the other input which is common to the AND gates 429 – 434 is the output of AND gate 435. The inputs to AND gate 435 comprise the appropriate sector pulse for the corresponding matrix and a radar trigger pulse coupled in on line 436 from the radar sync unit 404.

The outputs from the digital AND gates 409 – 414 and the outputs from the antenna shift register 417 are coupled into coincidizing matrix 418 composed of a plurality of digital AND gates having two inputs and an output line from AND gates 429 – 434. Two tracks will be considered and these tracks comprise the outputs from AND gates 419 of the coincidizing matrix 418 coupled through digital OR gates 424 and 426 to digital detectors 425 and 427, respectively. The digital detectors 425 and 427 produce outputs at 420 and 421, respectively, upon a determination of a track or no track being made. It is to be understood that other theoretical tracks may be set up in the coincidizing matrix 418 and that for each of the tracks under consideration an OR gate such as OR gates 424 and 426 and digital detectors 425 and 427 would be required.

Additionally, an antenna shift register corresponding to shift register 417 and coincidizing matrix corresponding to matrix 418 would be provided for each of the antenna sectors under consideration.

In the operation of the embodiment of FIG. 4 the receiver voltages from the radar system 402 are converted by the analog-to-digital converter 403 into binary coded numbers representing the receiver voltage. The number of bits required depends on the accuracy requirements of the system and can be determined through numerical analysis. The only requirement of the analog-to-digital converter is the generation and readout of these numbers in less time than that corresponding to range resolution expressed in time units.

The entire system operates the same as the embodiment of FIG. 3 corresponding to the analog track detection system except for the following differences. Digital AND gates are used with in conjunction with the range shift register 407 and also in the coincidizing matrix 418 in place of the analog AND gates of the embodiment of FIG. 3. Additionally, digital detectors are used instead of analog detectors.

The digital detectors corresponding to 425 and 427 perform the functions of counting and making a determination of a track or no track situation. Such a detector might sum the digital numbers during the hypothetical track and if this sum exceeds some predetermined number, a determination of a track detection is indicated. The detector may also perform the mathematical operations specified by the Neyman-Pearson theory or that of sequential detection as presented in copending application Ser. No. 58,855, filed Sept. 27, 1960.

It is to be understood that the above operation could also be performed using parallel rather than serial logic, however, for the purposes of illustration the serial logic is utilized.

As stated previously, the detect-before-track technique is a very common method of plotting a target track by means of a sequence of detections wherein each affirmative decision is associated with some region in physical space, and the time ordered sequence of these positions yields the target track wherein detections are performed on each single scan of the radar antenna.

The sample size depends upon pulse repetition rate, antenna rpm, and antenna beam width. Pertinent radar parameters are:

PROPOSED EXPERIMENTAL RADAR SYSTEM PARAMETERS

| | |
|---|---|
| Power | 35 kw avg. |
| Pulse | 121 element coded pulse sequence |
| | 12 usec elements |
| Rep. rate | 142/sec |
| Frequency | $\cong$435 Mc/s |
| Range coverage | 121 to 400 miles |
| Azimuth coverage | 360° |
| Antenna scan rate rpm | 1, 3, 6, 15 |
| Antenna beam | $\cong$4° hor., $\cong$20° vert. |
| Radar video process | Digital matched filter |
| Doppler Channels | 9–230 knot channels |

At one rpm the number of possible hits, $h$, is 94.7. Since the object in the medium may change from one space cell to an adjacent one, the sample size n is taken as $n = (h/2)$ or 47. The sample size is appropriately reduced for higher scan rate.

In utilizing a techinque such as this, one chooses a false alarm rate $\alpha$, according to the number of permissible false alarms. The decision rate in decision per hour is $D = (gl/nt) \times 3.6 \times 10^3$ where $q$ is the number of resolvable range intervals and $l$ is the number of Doppler channels. This assumes that the false alarm probability is the same for all ranges—the miss probability reduces with reduced range.

Figure 5:
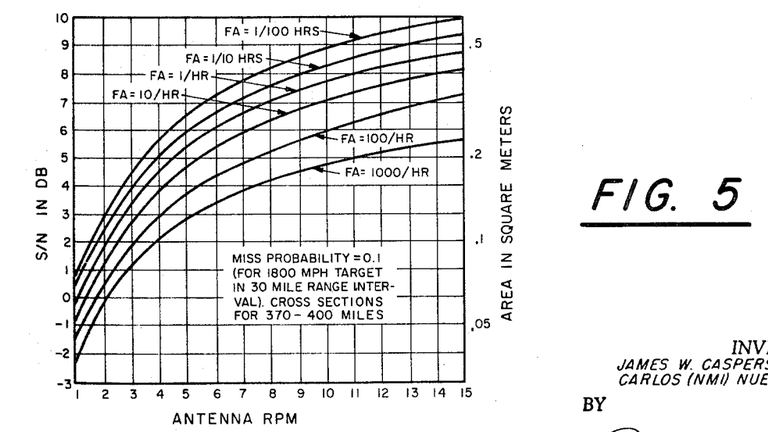
FIG. 5 is a graph illustrating the scan rate effect on detected target passage, B equal $10^{-1}$.
Figure 6:
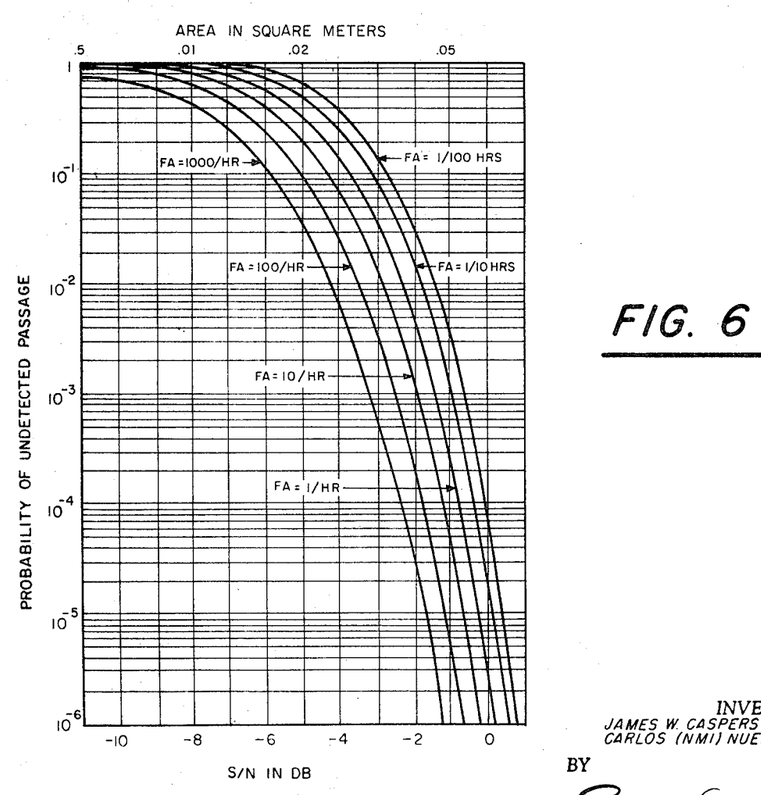
FIG. 6 is a graph of track-before-detect characteristics.

FIG. 5 predicts the probability for undetected passage of an 1800 knot object through a 30-mile observation annulus for a miss probability, B, of $10^{-1}$. The curves of FIG. 6 illustrate the effect of antenna rpm, which is about a 7 db loss at 15 rpm.

In contradistinction thereto, a track-detection system presents decisions relative to the existence of an object track, rather than a sequence of decisions relative to object positions. The process used consists of cross-correlation of radar data with a class of possible tracks followed by a decision or detection process. This increases the sample size available for the decision process and results in lower value of fixed false alarm probability $\alpha$ for fixed miss probability $\beta$. The number of decision processes is increased, but the reduction of $\alpha$ seems to more than off-set this.

The radar parameters are those listed previously in connection with the detect-before-track technique, except that the antenna scan rate is fixed at 15 rpm. Detection of long range objects at one rpm with the detect-before-track system is good. A chief objection is the slow scan rate which must be increased if short-range high-velocity tracks are desired.

The particular radar parameters chosen are not well suited to long range tracking in that a 4° beam at 400 miles is about 28 miles wide and does not approach the range resolution of one mile. In addition, the antenna is about 40 feet wide, and a larger antenna does not seem feasible for shipboard radar systems. Beam splitting and proper data processing would improve the tracking information but are not discussed.

Objects having a radial velocity much larger than their tangential velocities will only be treated. Objects which change azimuth angle within the annulus are not considered, nor objects having large changes in speed or increasing ranges, however, these could be accomplished by appropriate programming of the matrix. The only objects are those having radial velocities from 1200 to 1800 knots approaching the radar system. This limitation simplifies the enumeration of possible target tracks and, except for an increase in complexity, has little effect on detecting actual targets indicated in the class.

Figure 7:
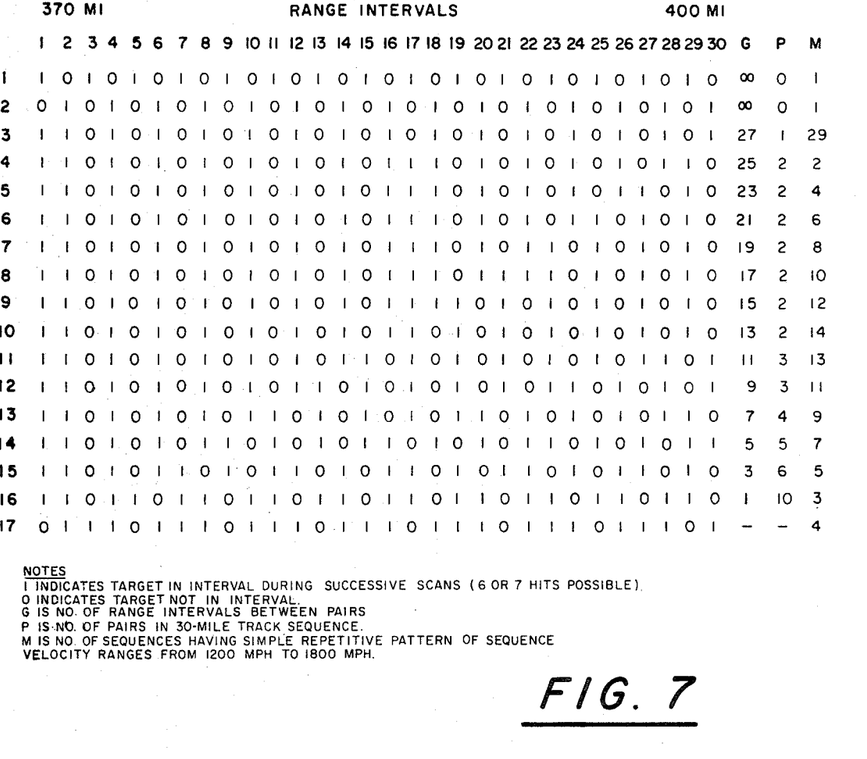
FIG. 7 is a table of typical track sequences.

FIG. 7 illustrates some of the possible tracks. An 1800 knot target will have either of the first two sequences, i.e., alternate 1's and 0's. A "1" indicates that the object is in the range zone while the antenna scans across it. Note that 1's do not stand for detections but only the sequence of positions under the hypothesis that such a target is present. A slightly slower object might have a single pair of adjacent points which can have any one of 29 positions. This would correspond to track 3. There are 136 such tracks for each 4° sector. There are also more complex tracks for the number of 1 and 0 groups between pair changes. However, many of the tracks are quite similar, for example, tracks 2 and 3. These tracks would be indistinguishable in practice and one or the other would be eliminated from the hypothesis class or they would be united. This reasoning leads to a crude estimate of the number of track decisions per hour. Decisions terminate with each rotation of the antenna, when new ones also start. Hence, one estimates about $10^7$ track decisions per hour for the thirty-mile zone of observation. Gross errors in this estimate have little effect on the final conclusions and this will soon become evident. Track detections are based on data drawn from storage according to the sequences representing the track hypothesis. Each sequence represents six or seven sample points, for each Doppler channel, drawn from the corresponding position cell. The accumulation of these points for a given track is the total sample for making the decision. The sample size for the fastest object, 1800 knots, is taken as 95 for prediction purposes, since it takes 60 seconds to traverse the 30-mile zone of observation and the object is covered about 1/90 of the time. Sample size for slower objects is greater but, for simplicity, the sample size is held at 95, and the results should be conservative.

FIG. 6 predicts the detection probabilities. The false alarm rate does not include the satellite decisions. This approach gives detection capabilities much better than the detectebefore-track system for an antenna scan rate of 15 rpm.

The close grouping of the curves for different false alarm rates indicates that the analysis is not overly critical with respect to the number of assumed tracks. A change of five orders of magnitude amounts to only a two db change in signal level. Tracks having high tangential components were omitted; however, these should present relatively large cross-sections and be relatively easy to detect.

Comparison of the two methods of detection, i.e., detect before track and track before detect, at a 15 rpm scan rate in both cases can be obtained by considering a specific example. Choose the FA = 1 per hour curve of FIG. 6 and the probability of undetected passage equal to $10^{-6}$. This requires $(S/h) = +0.2$ db however, since the curves of FIG. 5 were based on $n = (h/2)$ this figure should be increased to 3.2 db for comparison purposes. FIG. 6 indicates $(S/n) = 10.8$ for the same probabilities, an improvement of 7.6 db, in the case of the track-before-detect system. The foregoing results are based upon an optimum fixed sample test, Neyman-Person, for testing two simple hypotheses. Each track hypothesis is tested against noise, and probability ratios between tracks were not employed.

Thus, the system indicates that a track-detection concept has much to offer from a detection point of view in that a higher scan rate may be used without any resulting detection losses. In fact, the new technique has superior detection capabilities with higher antenna scan rates as compared to the conventional detect-before-track techniques.

It is to be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A track detection system comprising; receiving means for receiving reflected radio frequency signals from an object in a given medium, range storage means operatively coupled to said receiving means for storing range information therein between a minimum and maximum range, position indicating means operatively coupled to said receiving means for indicating the direction from which said radio frequency signals are received, position storage means comprising shift register means operatively coupled to said position indicating means for storing information therein corresponding to receiving means position and sequentially shifting said information through said register with respect to time, coincidizing means operatively coupled to said range storage means and said position storage means for coincidizing said range and position information and producing outputs therefrom when data corresponding to a particular range and a particular position of the receiving means are coincident therein, said coincidence means being operative to perform a cross-correlation with a class of possible tracks; counting means operatively coupled to said coincidizing means for counting a number of outputs from said coincidizing means and performing a decision as to the presence or absence of an object for each test track.

2. A track detection system as set forth in claim 1 wherein said coincidizing means is a digital AND gate matrix.

3. A track detection system as set forth in claim 1 wherein said coincidizing means comprises a multiplicity of analog AND gates.

4. A track detection system as set forth in claim 1 wherein said coincidizing means comprises an analog switch matrix.

5. A track detection system as set forth in claim 1 and further including quantizing means having an input and output for converting video information from said receiving means to binary information, said input being operatively coupled to said receiving means and said output being operatively coupled to said range storage means so that said range storage means is loaded sequentially in accordance with ones and zeros in accordance with information received from said receiving means.

6. A track detection system as set forth in claim 1 and further including reset means operatively coupled to said counting means for resetting said counting means upon termination of a probable track as indicated in said coincidizing means.

7. A track detection system for determining the probable existence of an object track in a medium comprising, antenna means for receiving reflected signals from objects in a medium, receiving means operatively coupled to said antenna means for receiving and amplifying information received on said antenna means, analog to digital converter means operatively coupled to said receiving means for converting received analog information to digital information, antenna position quantizer means operatively coupled to said antenna means for indicating the direction in which said antenna is pointed at any time and producing output pulses corresponding to antenna positions, at least one antenna position information storage means for storing pulses corresponding to a particular antenna direction with respect to time, information storage means operatively coupled to said receiving means for storing information representing range between minimum and maximum limits, a plurality of AND gates having inputs thereto and an output, one of said inputs of said AND gates being connected to said analog to digital converter means, another of said inputs to said AND gates being connected to said information storage means in such a manner that said AND gates are turned on sequentially and only one AND gate is on at any one time, coincidizing means operatively coupled to the output of said antenna position information storage means and to the output of said AND gates for producing outputs when antenna position information and range information are coincident in said coincidizing means, said coincidizing means being operative to perform a cross correlation with a class of possible tracks; and counting means operatively coupled to the outputs of said coincidizing means for determining the probability of a track in said medium.

8. A track detection system as set forth in claim 7 wherein said coincidizing means comprises a multiplicity of digital AND gates.

9. A track detection system as set forth in claim 7 and further including, antenna position information storage means for each of said antenna positions.

10. A track detection system as set forth in claim 7 wherein said antenna position information storage means is a shift register.

11. A track detection system for determining the probability of existence of an object track in a given medium comprising, antenna means for receiving signals reflected from objects in said given medium, antenna position quantizer means operatively coupled to said antenna for producing output pulses corresponding to antenna azimuth positions, receiver means operatively coupled to said antenna means for receiving and amplifying reflected signals received on said antenna means, range storage means operatively coupled to said receiver means for storing pulses therein representing range between minimum and maximum limits, a plurality of first analog AND gates having inputs and outputs, one of said inputs of said first analog AND gates being connected to said receiver means and another of said inputs of said first analog AND gates being connected to said range storage means, at least one antenna position information storage means operatively connected to said antenna position quantizer means for storing information therein corresponding to a particular antenna position, coincidizing means comprising a plurality of second analog AND gates operatively coupled to the outputs of said first analog AND gates and to the output of said antenna position information storage means for producing outputs therefrom when antenna position information and object information is coincident therein, and at least one analog counting means operatively connected to selected outputs of said coincidizing means for determining the probability of a possible track in said given medium.

12. A track detection system as set forth in claim 11 and further including, coincidizing means corresponding to each of said antenna sectors, and antenna position information storage means corresponding to each of said antenna positions.

13. A track detection system as set forth in claim 11 and further including, plurality of analog counting means corresponding to each of a class of possible tracks in said given medium connected to said coincidizing means.

* * * * *